(12) United States Patent
Wright (10) Patent No.: US 6,539,806 B2
(45) Date of Patent: Apr. 1, 2003

(54) FLUID-LOAD MEASUREMENT BY MAGNETIC EXCITATION AND VIBRATION SENSING OF A FLUID-LOAD-SENSITIVE DIAPHRAGM

(75) Inventor: Hubert A. Wright, Winchester, MA (US)

(73) Assignee: Starr-Johnson, Winchester, MA (US)

( * ) Notice: Subject to any disclaimer, the term of this patent is extended or adjusted under 35 U.S.C. 154(b) by 0 days.

(21) Appl. No.: 09/801,362

(22) Filed: Mar. 7, 2001

(65) Prior Publication Data

US 2002/0124645 A1 Sep. 12, 2002

(51) Int. Cl.[7] .............................................. G01L 11/00
(52) U.S. Cl. .............................. 73/703; 73/715; 73/728
(58) Field of Search ........................ 73/703, 722, 728, 73/146.5, 708, 735, 730, 756, 715

(56) References Cited

U.S. PATENT DOCUMENTS

| | | | |
|---|---|---|---|
| 3,643,153 A | 2/1972 | Stewart et al. ................. 324/57 |
| 3,693,445 A | 9/1972 | Johnson ......................... 73/290 |
| 3,820,098 A | 6/1974 | Demyon et al. ........ 340/244 B |
| 3,967,490 A | 7/1976 | Brady ............................. 73/32 |
| 4,107,994 A | 8/1978 | Sogo ............................ 73/290 |
| 4,112,760 A | 9/1978 | Ishiwata ....................... 73/299 |
| 4,174,638 A | 11/1979 | Zabler et al. |
| 4,193,291 A | 3/1980 | Lynnworth ..................... 73/32 |
| 4,193,303 A | 3/1980 | Emgell ......................... 73/438 |
| 4,339,955 A | 7/1982 | Iwasaki |
| 4,343,184 A | 8/1982 | Jaulmes ........................ 73/299 |
| 4,424,705 A | 1/1984 | Hattori et al. |
| 4,458,196 A | 7/1984 | Goyal et al. ................... 324/57 |
| 4,526,480 A | 7/1985 | Ward ........................... 374/117 |
| 4,535,627 A | 8/1985 | Prost et al. ..................... 73/290 |
| 4,545,245 A | 10/1985 | Sharp .......................... 73/290 |
| 4,627,292 A | 12/1986 | Dekrone ....................... 73/728 |
| 4,649,341 A | 3/1987 | Ulbrich et al. ............... 324/207 |
| 4,719,362 A | 1/1988 | Nest et al. ................... 307/116 |
| 4,740,726 A | 4/1988 | Umezawa ................... 310/316 |
| 4,859,942 A | 8/1989 | Charton et al. ............. 324/208 |
| 4,864,232 A | 9/1989 | Redlich ....................... 324/207 |
| 4,896,535 A | 1/1990 | Duckart et al. ............... 73/290 |
| 4,920,796 A | 5/1990 | Duckart et al. ........... 73/290 V |
| 4,922,745 A | 5/1990 | Rudkin et al. ................. 73/32 |
| 4,961,345 A | 10/1990 | Tsuruoka ...................... 73/32 |
| 5,035,140 A | 7/1991 | Daniels et al. ................ 73/290 |
| 5,054,318 A | 10/1991 | Lew ............................ 73/290 |
| 5,074,148 A | 12/1991 | Lew ............................ 73/290 |
| 5,184,510 A | 2/1993 | Rossman ..................... 73/290 |
| 5,285,154 A | 2/1994 | Burreson |
| 5,332,966 A | 7/1994 | Berberich ............. 324/207.12 |
| 5,345,811 A | 9/1994 | Alexandrovich, Sr. ......... 73/32 |
| 5,351,004 A | 9/1994 | Daniels et al. ......... 324/207.13 |
| 5,359,902 A | 11/1994 | Barger et al. .......... 73/862.626 |
| 5,383,349 A | 1/1995 | Blake-Coleman .............. 73/32 |
| 5,534,853 A | 7/1996 | Pioch .......................... 340/646 |
| 5,569,866 A | 10/1996 | Allison |
| 5,600,997 A | 2/1997 | Kemp et al. .................. 73/290 |
| 5,743,138 A | 4/1998 | Cheng ....................... 73/322.5 |

(List continued on next page.)

*Primary Examiner*—Hezron Williams
*Assistant Examiner*—Jermaine Jenkins
(74) *Attorney, Agent, or Firm*—Cesari and McKenna, LLP; Joseph H. Born, Esq.

(57) ABSTRACT

Magnetic force from a momentarily excited coil (34) results in oscillatory flexure of a flexible diaphragm (30) loaded on one side by a liquid (10) whose level is to be measured. A permanent magnet (42) mounted on the diaphragm (30) so moves with diaphragm flexure as to vary the magnetic saturation of a saturable circuit in which the coil (34) generates flux. By determining the coil's inductance under quiescent-diaphragm conditions, a computer (56) can infer the ambient pressure that bears upon the liquid (10). By compensating for the static pressure thus inferred, it can then determine liquid level by observing diaphragm oscillations reflected in coil electromotive force generated by the magnet (42) as the diaphram (30) undergoes oscillatory flexure in response to the coil's momentary excitation.

29 Claims, 9 Drawing Sheets

U.S. PATENT DOCUMENTS 5,929,391 A     7/1999  Petrucelli et al.
6,016,707 A  *  6/2000  Lin et al. ...................... 73/728
6,079,266 A  *  6/2000  Wright ......................... 73/299
6,089,098 A  *  7/2000  Tylisz et al. .................. 73/722

* cited by examiner

FLUID-LOAD MEASUREMENT BY MAGNETIC EXCITATION AND VIBRATION SENSING OF A FLUID-LOAD-SENSITIVE DIAPHRAGM

BACKGROUND OF THE INVENTION

1. Field of the Invention

The present invention is directed to liquid-load measurements and in particular to sensors of the vibrating-diaphragm type.

2. Background Information

Many approaches have been taken to making liquid-load measurements. One approach particularly well suited to some applications is that of determining the loading on a vibrating diaphragm that has been placed in contact with the liquid. The mass of liquid that loads the diaphragm affects the diaphragm's response to flexural excitation. The loading inferred from the diaphragm's vibration can be used to determine the depth of a liquid of known density or the density of a liquid of known depth.

U.S. Pat. No. 5,035,140 to Daniels et al., for instance, describes a sensor arrangement in which a member potentially loaded by liquid in a tank is caused to vibrate, and the resultant vibration is measured to determined whether it is consistent with the member's being loaded by the liquid. Such a sensor is employed to determine whether liquid in a tank has reached a level at which the sensor is mounted.

Although the Daniels et al. sensor presumably performs adequately for the intended purpose, it is not well suited to providing a relatively accurate liquid-load measurement throughout a continuous load range. For that purpose, U.S. Pat. No. 5,345,811 to Alexandrovich et al. describes an approach that can be used to measure the density of fuel in an aircraft tank. The Alexandrovich et al. arrangement infers the density from the natural vibration frequency of a diaphragm as loaded by the fuel, with which the diaphragm is in contact. To achieve the desired accuracy, Alexandrovich et al. employ processor-based calibrations to determine coefficients in an equation relating the density to the natural frequency. With these coefficients, a processor calculates the density of the tested fluid from the observed frequency.

To minimize the effects that ambient-pressure variations would have on the measurement, Alexandrovich et al. mount and excite the diaphragm in a special fashion. Specifically, the diaphragm extends through a sealed slit in the tank wall, and the diaphragm is so excited as to assume vibration in a mode that has a node at the wall location. This allows both faces of the diaphragm to be exposed to the fuel so as to cancel out pressure effects.

My previous U.S. Pat. No. 6,079,266 describes an arrangement that eliminates the need for complex mounting of the type that Alexandrovich et al. use to minimize pressure effects. That arrangement simply takes a static-flexure measurement along with the measurement of the diaphragm's response to flexural excitation. By using calibration data taken for different pressures, it uses the static measurement in the liquid-loading calculation to eliminate any pressure effects. And it employs a common strain gauge both for the static-flexure measurement and for the measurement of the response to flexural excitation.

SUMMARY OF THE INVENTION

I have now developed an effective way to make the necessary static and dynamic measurements without a strain gauge, simply by using signals developed in the coil used to excite the diaphragm. I so mount a permanent magnet on the flexible diaphragm that diaphragm flexure displaces it, and I provide the coil with a saturable magnetic circuit so positioned with respect to the magnet that its degree of saturation significantly depends on the permanent magnet's displacement. This makes the coil's inductance relatively sensitive to the diaphragm's flexure, so the static pressure can be determined from the coil inductance. Moreover, the diaphragm's response to flexural excitation can be determined from the coil signal induced by the moving permanent magnet's field.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
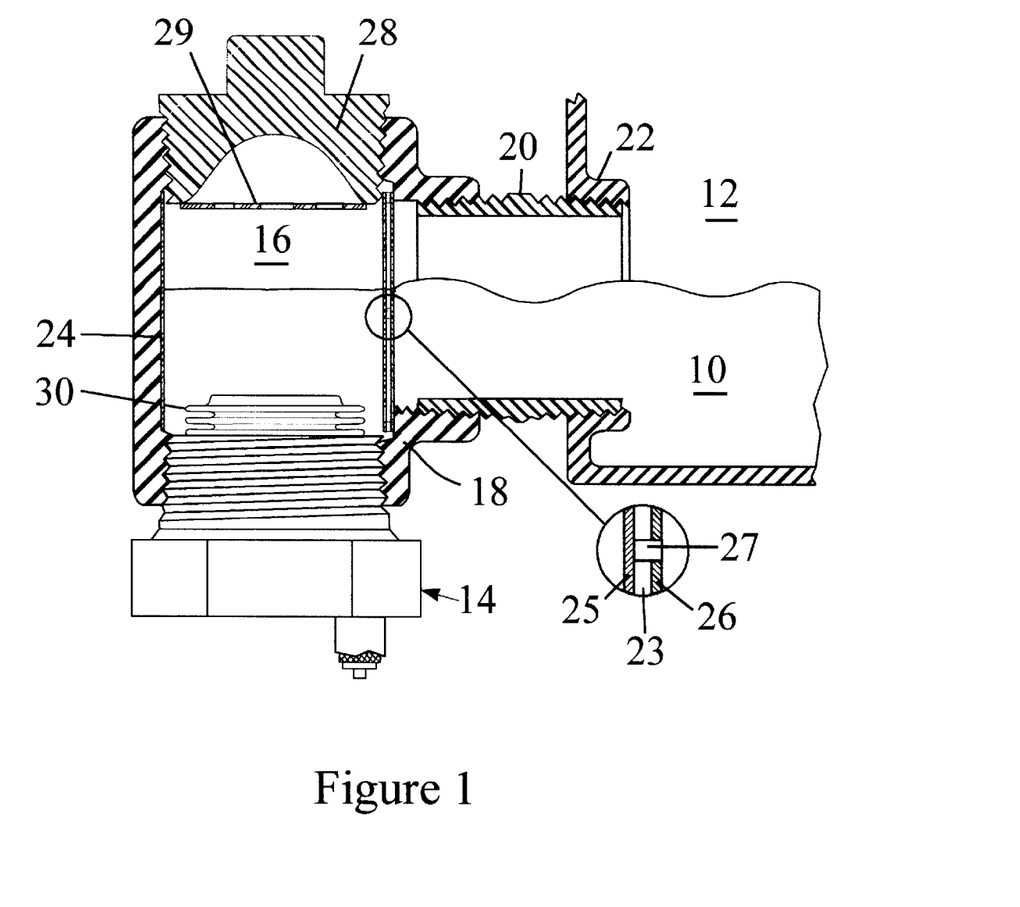
FIG. 1 is a cross-sectional view of a fluid reservoir on which a measurement chamber and a sensor assembly embodying the present invention's teachings have been mounted.

FIG. 1 depicts an embodiment of the invention in which it is applied to sensing liquid loading. In particular, the density of a lubricant liquid 10 in a lubricant reservoir 12 is known, and the sensor is used to indicate level. But it will be apparent that the same approach to liquid-load measurement can be used to determine the density of a fluid whose level is known.

The reservoir 12 may be the lubricant sump of a compressor in a compressor bank, for instance. Such a compressor bank is the preferred cooling-system configuration in some commercial installations, and it is particularly important in such installations to monitor the reservoir's lubricant level so that the compressor will not have its lubricant scavenged by other compressors in the bank. The illustrated embodiment also simultaneously measures temperature and pressure, which are quantities that it is valuable to know in order to make system-management determinations such as whether the lubricant has absorbed excessive refrigerant.

The present invention's approach to monitoring a fluid level is to excite a flexible diaphragm in contact with the lubricant 10 and infer the fluid's level from the diaphragm's response. The sensor assembly containing the diaphragm can be placed anywhere in the lubricant reservoir 12 that will permit the diaphragm to be in contact with the liquid 10. In the particular application that FIG. 1 illustrates, though, I prefer to place the sensor assembly 14 at the bottom of a separate but connected chamber 16.

The chamber 16 is formed by a chamber housing 18 that a coupling 20 secures into the sight-glass port 22 commonly provided in such installations in order to monitor lubricant level visually. The liquid 10 is free to flow into the chamber 16 through an axially extending slit 23 in an overlapped sleeve 24 within the chamber. The sleeve serves to form a uniform measurement cross-section and effectively to isolate the sensor assembly 14 from the compressor sump. The sleeve 24 may consist, for instance, of a coiled strip of 0.010-inch—(0.025-cm-) thick shim stock formed into a shape that is nearly circular, with the exception that its free ends 25 and 26 overlap and are spaced slightly apart by several small bent-back tabs 27 that free end 26 forms. If contamination by particles is of concern, screening can be added. A plug 28 caps the chamber. The cavity at the base of the plug 28 may be covered with a perforated plate 29, which cooperates with the sleeve 24's smooth but acoustically lossy surface to attenuate acoustic modes that diaphragm excitation can cause.

Figure 2:
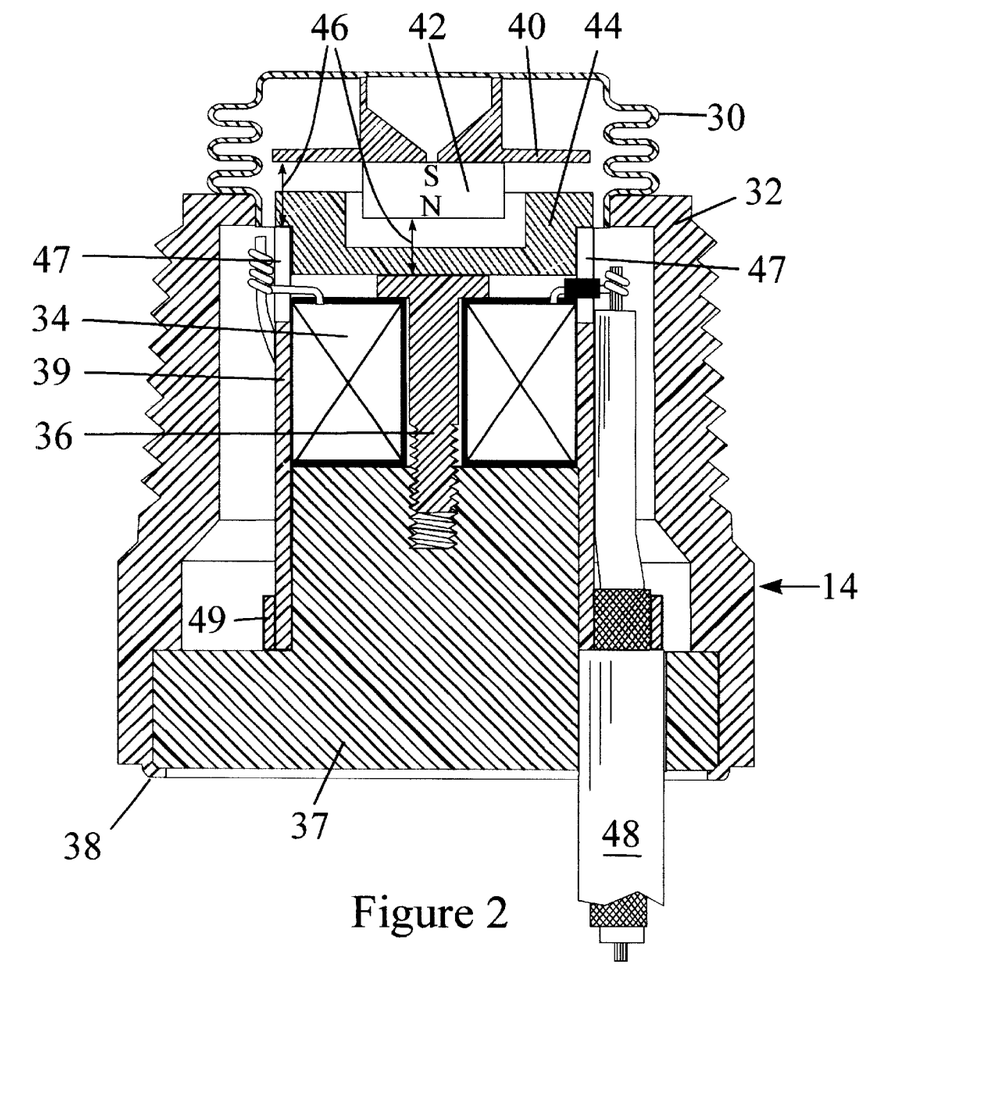
FIG. 2 is a cross-sectional view of the sensor assembly.

FIG. 2 shows that the sensor assembly 14 includes a diaphragm 30 supported by a sensor housing 32 to which it is attached by solder or brazing. The housing forms the exterior threads by which the assembly is mounted in FIG. 1's chamber housing 18. The diaphragm 30 is shown as a hydro-formed element, but it could be fabricated in some other fashion; it could be a welded bellows, for instance. The preferred embodiment's diaphragm material is beryllium copper, but numerous suitable alternative materials are applicable. In some embodiments it may also be desirable to use a mechanical spring to augment the diaphragm's elastic properties, particularly if the bellows is made of a material such as phosphor bronze or stainless steel. The illustrated embodiment's diaphragm mounting is so simple because the present invention's approach to dealing with pressure effects, which will be explained below, eliminates the need to use complicated pressure-equalizing techniques for mounting.

As part of the diaphragm exciter, the illustrated embodiment includes a coil 34. The coil 34 may include, say, 1400 turns of #38 magnet wire wound on a bobbin secured by a magnetically permeable retaining screw 36, such as a #4–40 steel screw, to a magnetically permeable base member 37 retained by a rolled or crimped lip 38 that the sensor housing 32 forms. A magnetically permeable sleeve 39, preferably having a 0.028-inch—(0.071-cm-) thick steel wall, surrounds the coil 34. A magnetically permeable pedestal 40 is welded, soldered, or similarly attached to the inside of the diaphragm 30. This pedestal forms a face that may, for example, be a 0.563-inch—(1.430-cm-) diameter steel disk having a thickness of 0.020 inch (0.051 cm).

A permanent magnet 42 is mounted on the pedestal's face. The magnet may, for instance, be a 0.25-inch (0.64-cm) diameter neodymium-iron-boron axially magnetized disk whose thickness is 0.1 inch (0.3 cm). Other rare-earth, high-field-strength magnets having high Curie temperatures are also suitable. Acceptable materials for the magnetically permeable components include metals having substantial iron content such as soft iron and carbon steel. A non-magnetic mechanical stop 44 protects the diaphragm from excessive deformation by stopping the pedestal 40 and magnet 42 before external pressure deforms the diaphragm too far toward the coil 34. The bellows diaphragm's elastic properties determine the maximum permissible bellows stroke, which may be of the order of 0.020 to 0.040 inch (0.051 to 0.102 cm).

Base 37, sleeve 39, pedestal 40, magnet 42, and retaining screw 36 form a magnetically biased magnetic circuit in which the magnet 42 is nested co-axially with the coil 34 and separated from it by a sensing gap 46. The flux path between the magnet and the coil spans the gap 46 between the tip of the magnet 42 and the top of the retaining screw 36 and between the tip of the pedestal 40 and the top edge of the coil retaining sleeve 39. Gaps of approximately 0.1 inch (0.3 cm) make the coil inductance relatively sensitive to the magnet 42's position, and this sensitivity is desirable for reasons that will be set forth below. Small slots 47 in each side of the retaining sleeve 39 permit connections between the coil and a cable 48's conductors. A strain-relief clamp 49 secures the cable 48 to the sensor body.

The illustrated embodiment determines temperature and pressure by repeatedly measuring the coil's resistance and inductance. It also repeatedly displaces the diaphragm and its attached magnet from their stable positions by pulsing the coil, as will be described in more detail below. The magnet's resultant oscillations induce oscillatory coil voltage whose frequency is related to the fluid level and, to some extent, the ambient pressure. To make measurements based on these factors, the cable 48 extends through a hole in the base 37 and runs between the coil 34 and computation circuitry depicted in FIG. 3. Since the illustrated embodiment uses only the coil for all measurements, a simple coaxial cable is all that is required.

Figure 3:
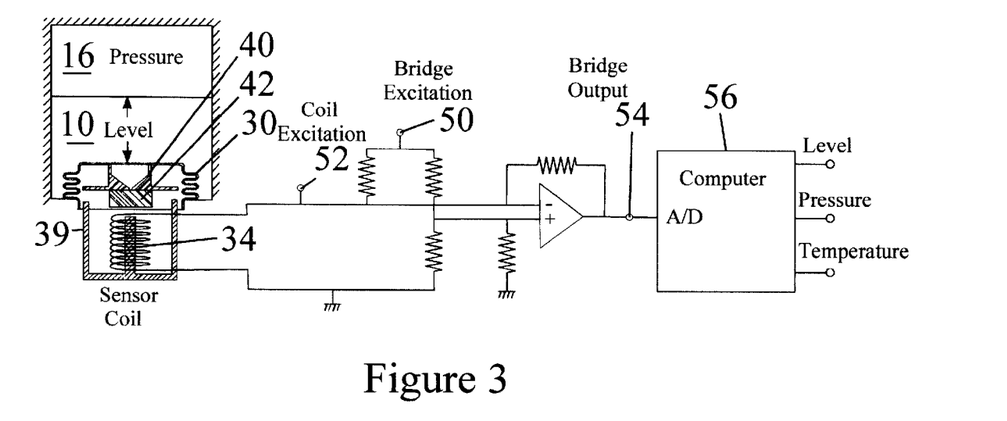
FIG. 3 is a schematic diagram of the circuitry employed by the sensor assembly to determine temperature, ambient pressure, and fluid level.

As FIG. 3 shows, the coil 34 is one leg of a standard bridge-type detection circuit that the computation circuit includes. Periodically—say, every second or two—circuitry not shown applies a transient voltage step to the bridge's excitation point 50. In the illustrated embodiment this step is –0.33 volt and persists for 3.5 milliseconds, as FIG. 4's top trace indicates. That step's amplitude is low because its purpose is to elicit a coil response under quiescent-diaphragm conditions. As the middle trace indicates, circuitry not shown applies a brief intense impulse immediately thereafter to the coil at another excitation point 52. In the illustrated embodiment, this coil-excitation pulse's magnitude is 12 volts and lasts for 300 microseconds. The resultant bridge-detector output appears at node 54, whose signal is the input to a computer 56's analog-to-digital port. From the resultant data, the computer 56 determines temperature, pressure, and level in a manner that will now be described.

Figure 4:
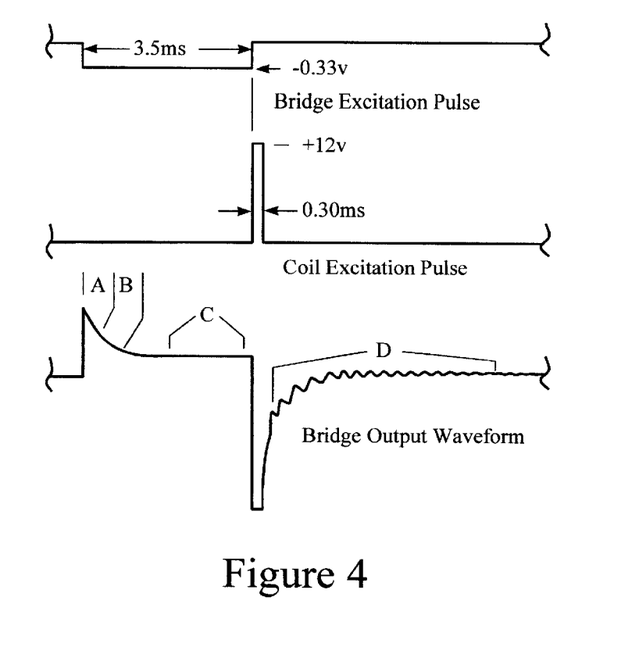
FIG. 4 is a graph that plots sensor-coil stimuli and the resultant responses.
Figure 5:
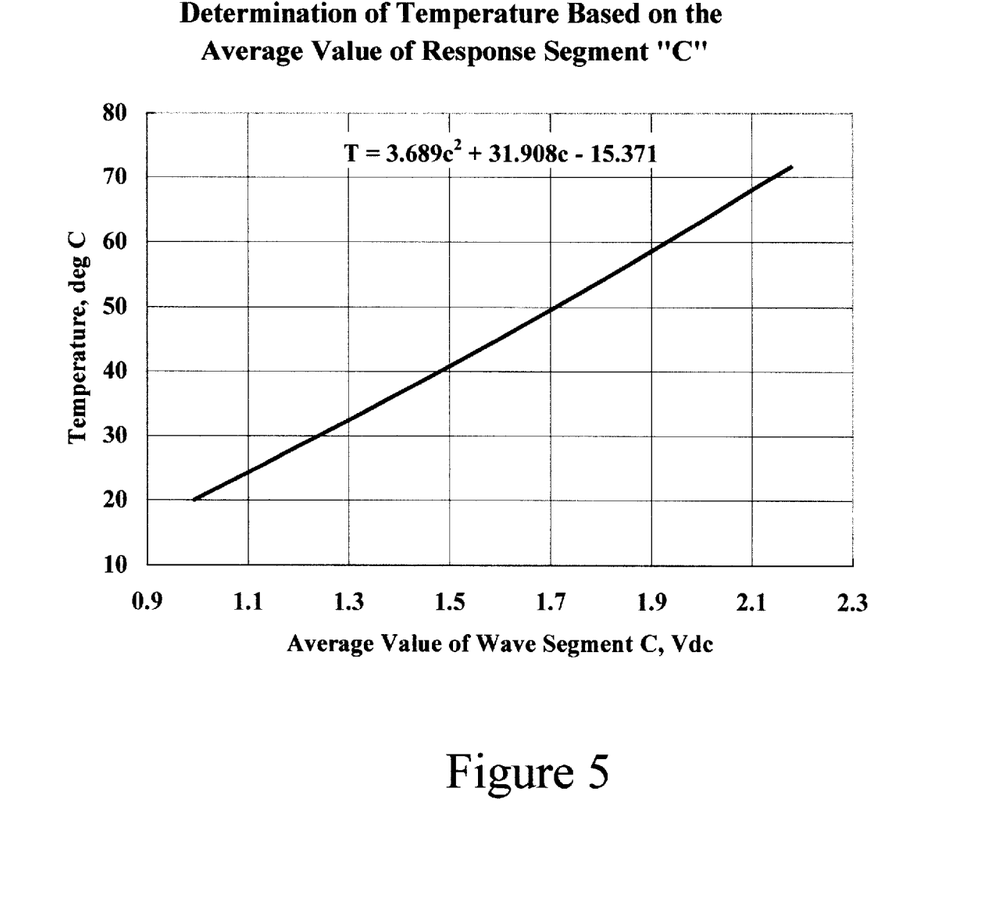
FIG. 5 is a diagram depicting the relationship between temperature and a coil-resistance-indicating measurement.

FIG. 4's bottom trace shows that the response at node 54 to the step stimulus at node 52 includes three segments labeled A, B, and C. Segments A and B are within the transient part of the response to the step and are associated with the coil's inductive characteristic. Segment C is well past the initial transient, so it can be thought of as a constant-stimulus response, and its level is the same as what the output would be if the coil were purely resistive. Since coil resistance depends on temperature, the computer 56 uses the segment-C level to determine coil temperature. Beginning at the onset of the bridge excitation, the illustrated embodiment samples the output (node-54) waveform at a data rate of 100,000 samples per second. Time segment C is chosen as samples 300 through 330 (3.0 through 3.3 milliseconds). The computer takes the average of twenty-one data points, and in the illustrated embodiment the (temperature-dependent) result c is related to temperature T in accordance with a function that FIG. 5 illustrates. Of course, the corresponding functions for other embodiments will not in general be the same as that of FIG. 5.

As the pressure on the sensor increases, it increasingly compresses the diaphragm 30, moving the magnet 42 and pedestal 40 closer to the coil 34. If the dimensions of the coil, gap, pedestal, magnet, and collar are chosen as described above, the magnet's motion will result in substantial and easily detected coil-inductance changes. During time segments A and B, the bridge output's rate of decay-which the so-called characteristic time of the step response determines-depends on the coil 34's resistance and inductance. Since by measuring temperature during time segment C the computer has implicitly determined coil resistance, it can determine the coil's inductive component, as will now be explained.

In the illustrated embodiment, time segments A and B are contiguous, with segment A beginning at the first sampled waveform value. Their combined duration is chosen to span approximately one characteristic time. For example, time segment A has been chosen in the illustrated embodiment as the first thirty-two sample intervals and time segment B as the next thirty-two. Since the sample rate is 100,000 samples per second, the resultant data cover the first 640 microseconds. The computer uses a ratio b/a to characterize the transient decay, where a is the result of subtracting the average segment-C sample value from the average segment-A sample value and b is the result of subtracting the average segment-C sample value from the average segment-B sample value. If the inductive step response is assumed to be an exponential decay, it can be shown that the characteristic time $t_c$, is related to the ratio b/a in the following way:

$$t_c = t_1 / \ln(a/b),$$

where $t_1$ is the time associated with the end of segment A (320 microseconds in the example above) and segments A and B are assumed to be equal in duration. Using averaged values and a ratiometric relationship in this manner makes the characteristic-time determination both amplitude independent and relatively noise insensitive.

Now, the computer 56 infers pressure from the inductance-dependent ratio b/a; pressure affects the magnetic-circuit gap and thus the inductance, so the ratio b/a depends on pressure. But that ratio is also temperature-dependent, since temperature affects coil resistance and magnetic factors such as the magnetic-circuit components' permeabilities and the permanent magnet's field strength. To compensate for temperature, the computer uses a compensation function that has been determined during calibration by observing b/a changes that result from varying the temperature without changing the pressure. (The term calibration here is not intended to suggest that the function-determining data must be taken for every sensor system made. Although it can be, it will be more typical for the data to be taken for one or a representative sample of a given design's instances, and the resultant function will then be included in all sensors made in accordance with that design.) From such observations, a plot is made, as a function of the temperature-indicating average segment-C sample value, of the ratio between the observed b/a value and the b/a value at a reference-temperature-indicating average segment-C sample value.

Figure 6:
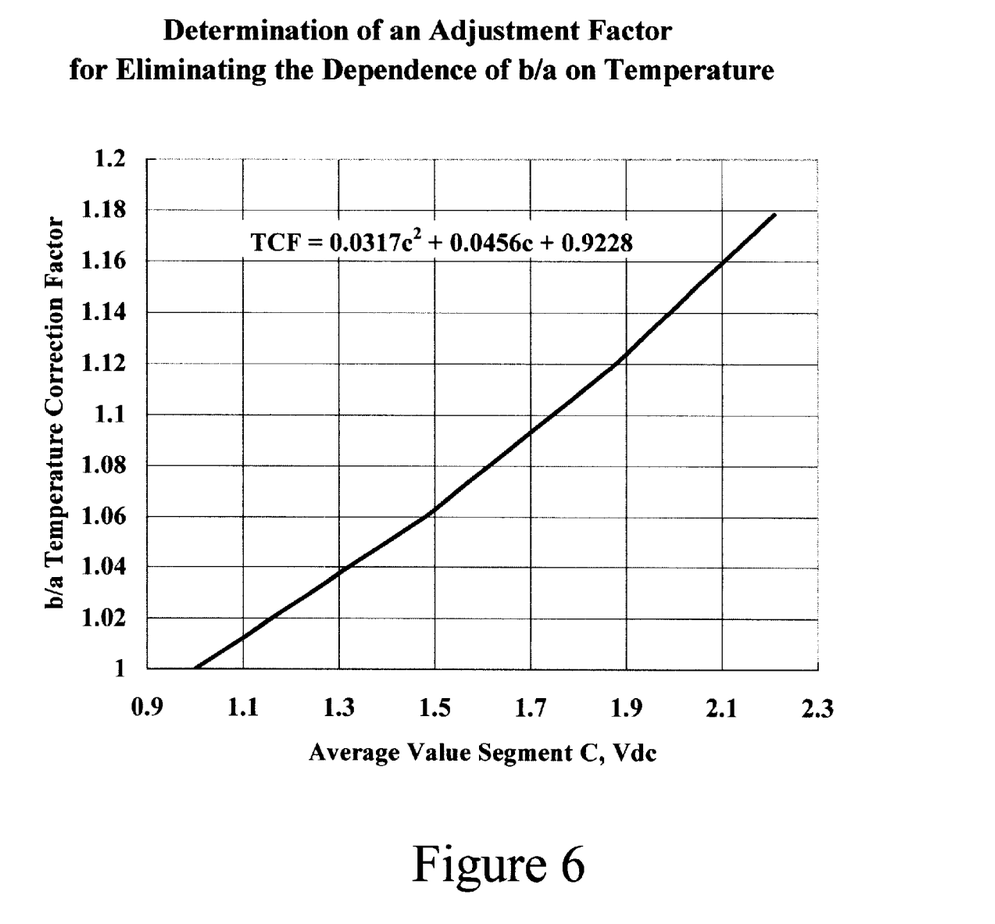
FIG. 6 is a plot depicting a temperature-correction factor used to convert an inductance-indicating measurement taken at one temperature to the value it would have had at a reference temperature.

FIG. 6 shows a typical relationship thus determined for a fixed inductance. By applying the polynomial that best fits the measured data, the ratio b/a measured at any expected temperature can be corrected computationally to a reference temperature, such as the temperature that corresponds to the value c=1. In the illustrated embodiment, that temperature is approximately 20° Celsius. Of course, some other reference temperature can be employed instead. But a prudent choice is the expected average temperature at which the system is to be used. To eliminate temperature effects, the computer multiplies the measured ratio b/a by the temperature-correction factor ("TCF") shown. As FIG. 6 illustrates, applying that factor yields the following result:

$$(b/a)_1 = (0.0317c^2 + 0.0456c + 0.9228)(b/a),$$

where c is the average value recorded during time segment C, b/a is the measured ratio, and $(b/a)_1$ is the ratio corrected to the c=1 reference value.

Figure 7:
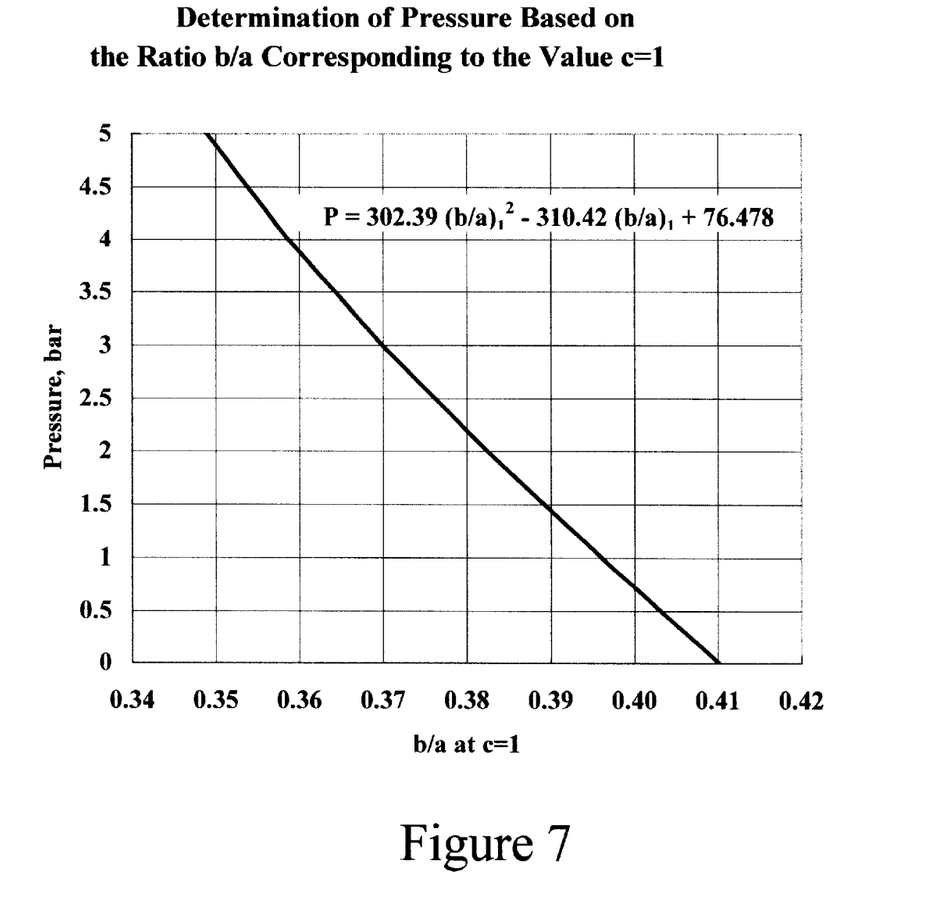
FIG. 7 is a diagram depicting the relationship between ambient pressure and the temperature-corrected inductance-indicating value.

The pressure P can then be computed from the temperature-corrected ratio $(b/a)_1$ in accordance with a best-fit polynomial approximation to previously obtained calibration data. FIG. 7 depicts the following typical polynomial result:

$$P = 302.39(b/a)_1^2 - 310.42(b/a)_1 + 76.478,$$

where P is the pressure in bar.

The system has thus inferred static pressure from the bridge-circuit response, depicted by FIG. 4's bottom-plot segments A, B, and C, to the relatively long-duration initial step represented by the left portion of FIG. 4's top plot. The measurements taken to obtain this value resulted from a measurement made with the diaphragm in its quiescent state; the small step signal is not large enough to cause any significant diaphragm flexure.

In contrast, the measurements to which the computation circuit next turns are made while the diaphragm is vibrating. It determines fluid level from a portion, represented by the bottom plot's segment D, of the bridge response to the coil-excitation pulse that FIG. 4's middle plot represents. That pulse results in flexural diaphragm oscillations, and the resultant electromotive force caused by the magnet's movement with respect to the coil causes the segment D output to reflect these oscillations. As the fluid level increases, the resultant mass-loading increase reduces the flexural frequency. So the computer 56 infers the mass load by spectrally analyzing the response's segment D in a manner that will now be described.

To determine an oscillation frequency, the illustrated embodiment starts by sampling a 5-millisecond record in time segment D that begins 9 milliseconds after the first bridge excitation. The system suppresses noise by so filtering the data as to limit it to a frequency band of 900 Hz to 5000 Hz. It subjects the resultant, filtered data to a spectral analysis to obtain the oscillation frequency. Although the particular type of spectral analysis is not crucial—various approaches such as baseline-crossing timing, etc. may be employed, for instance—the illustrated embodiment employs a discrete Fourier transform for that purpose.

But applying such a transform to a record of only 5 milliseconds would result in a frequency resolution of 200 Hz, which is coarser than is preferable. Instead of taking a longer record of the bridge output, though, the system artificially extends the record by adding zero-value data points. This is beneficial from a noise standpoint because the diaphragm's flexural oscillation in the illustrated embodiment will have essentially died out in that time. The addition of the zero-value points brings the record to a length of 8192 data points. This number is a power of two so that the system can use the fast-Fourier-transform algorithm, and the resolution supported by the resultant 81.92-millisecond record is 12.2 Hz.

The frequency of the spectral analysis's peak output is the quantity from which the system infers fluid level. This flexural spectral peak frequency is dependent not only on fluid level but also, to some extent, on pressure. One might therefore infer fluid level by employing a two-dimensional look-up-table in which the inputs are pressure and frequency and the table contents are fluid-level values recorded in a calibration operation for those pressure-frequency combinations. In the ranges for which the illustrated embodiment is intended, though, I have observed a relationship in such data that enables the illustrated embodiment to approximate the same result in a less data-intensive way.

Figure 8:
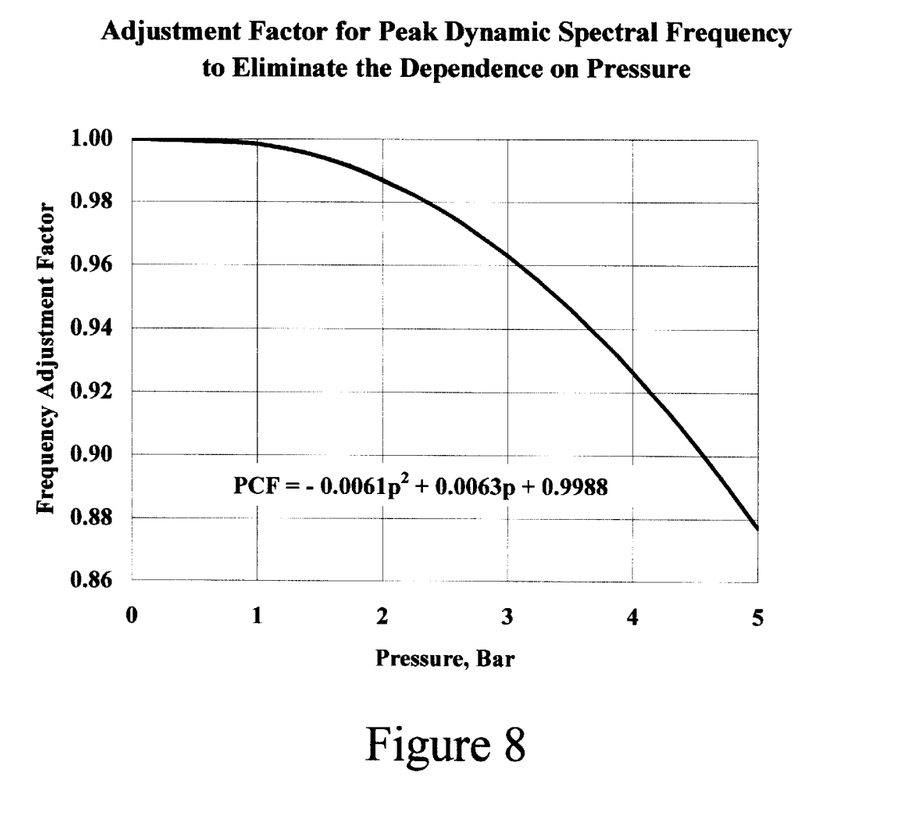
FIG. 8 is a diagram depicting an adjustment factor used to convert a measured peak vibration-spectrum frequency to the value it would have had at a reference pressure.

Specifically, I have observed that the ratio of (1) the frequency that results from a given loading level at a reference pressure (say, 0 bar) to (2) the frequency that results from the same loading level at the some other pressure is, as a function of that other pressure, largely independent of the loading level. FIG. 8 depicts an example of such a function. This function, which I call the "pressure-correction factor," can therefore be determined at calibration time by taking measurements at only a single level. However, I prefer to reduce the effects of calibration-time noise by taking values at several levels and averaging over the levels.

Figure 9:
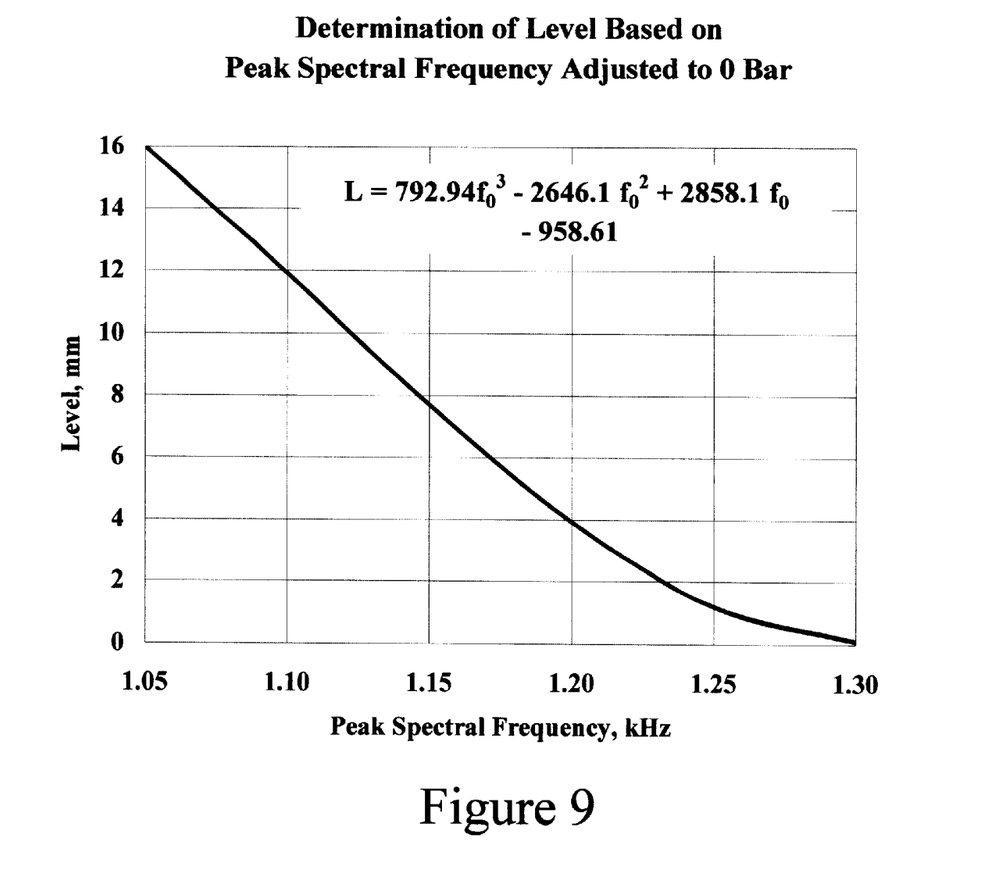
FIG. 9 is a diagram of a typical relationship between the pressure-compensated frequency and fluid level.

At measurement time, the system multiplies the frequency of the spectral analysis's spectral-peak output by the pressure-correction factor for the just-measured pressure to determine what the frequency for the current fluid level would have been at the reference pressure. That level can then be inferred from a reference-pressure relationship determined at calibration time between frequency and fluid level. FIG. 9 depicts an example of such a relationship, in which the liquid level L in millimeters is given by $$L = 792.94 f_0^3 - 2646.1 f_0^2 + 2858.1 f_0 - 985.61,$$

where $f_0$ is the peak spectral frequency in kilohertz at zero bar.

Although I have found considerable practical advantage in using numerically sampled digitized data for the calculation of the output variables and correction factors, the present invention's teaching can be implemented by using other techniques, too.

Figure 10:
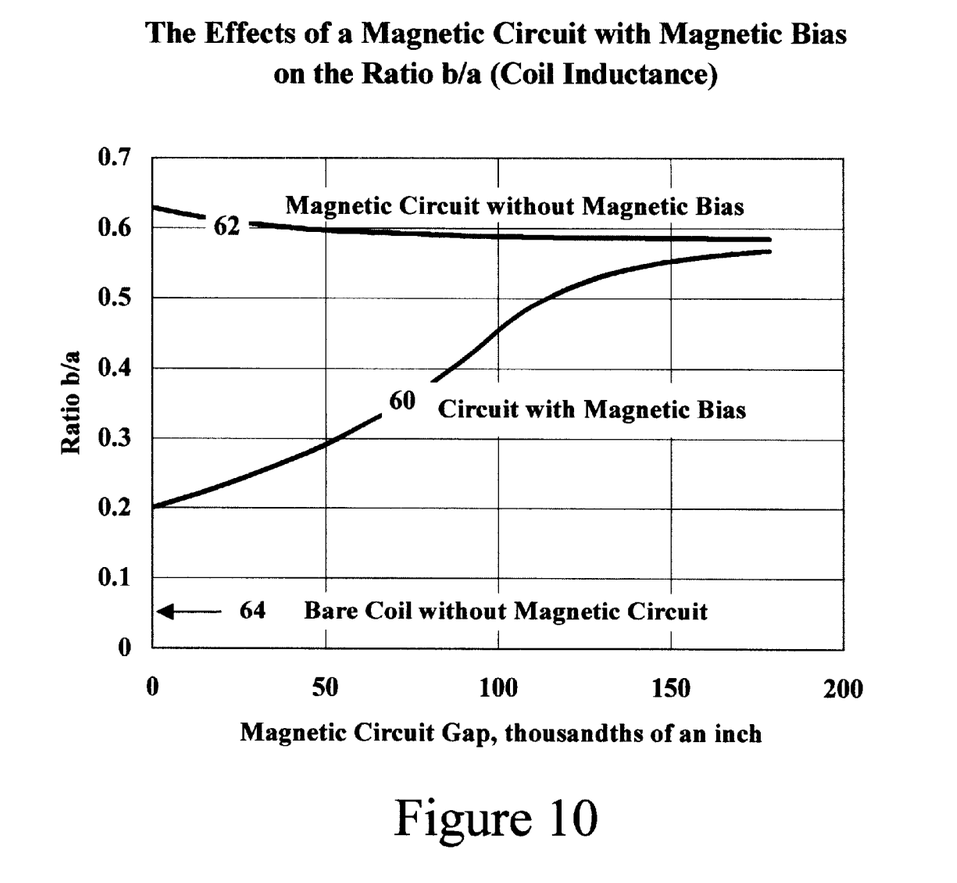
FIG. 10 is a diagram that compares the illustrated system's relationship between a coil-inductance-indicating sample-average ratio and a variable gap in the coil's magnetic circuit with similar relationships for arrangements in which the coil's magnetic circuit has (1) high-permeability material but no magnetic bias and (2) no high-permeability material.

The particular dimensions employed in the illustrated embodiment are not required in order to practice the present invention's teachings, but it is important that, whatever dimensions are chosen, the permanent-magnet position and gap size be so selected as to result in a relatively high sensitivity of coil inductance to diaphragm flexure. FIG. 10 illustrates how gap size was selected in the illustrated embodiment. That drawing shows that the inductance for high gap sizes approaches the unbiased-circuit value of FIG. 10's upper plot 62. Plot 62 represents the values in which FIG. 2's arrangement would result if the permanent magnet were replaced with a steel disc of the same size.

As the diagram plots' slopes show, such an unbiased arrangement would exhibit some inductance variation with diaphragm flexure, but that variation would be much less than that of the illustrated embodiment's biased circuit, at least in the gap range of approximately 0.05 inch (1.3 mm) to 0.10 inch (2.5 mm). The inductance's sensitivity to gap size decreases above that range, and one may infer from a comparison between plots 60 and 62 that, by a gap size of about 0.18 inch (4.6 mm) the magnetic circuit is almost completely unsaturated. The sensitivity falls off below that range, too. However, by comparison with level 64, which represents a coil measurement taken after all ferromagnetic materials have been removed, plot 60 shows that the magnetic circuit remains somewhat unsaturated even at a gap size of zero. Since the sensitivity-indicating slope falls off greatly above 0.10 inch (2.5 mm), which is the thickness of the permanent magnet 42, the uncompressed gap size is chosen to approximate that magnet's thickness.

Although I have described the invention by reference to an example that measures the level of a liquid of known density, it is apparent that the same approach can be used to measure the density of a liquid whose level is known. The invention thus lends itself to a wide range of applications and constitutes a significant advance in the art.

What is claimed is:

1. A fluid-load sensor comprising:
   A) a diaphragm assembly including:
      i) a flexible diaphragm forming first and second diaphragm faces; and
      ii) a permanent magnet that generates a permanent-magnet field and is mounted on the diaphragm for displacement with flexure thereof;
   B) a diaphragm support that so supports the diaphragm assembly as to enable the first diaphragm face to be exposed to an unknown fluid under pressure and to permit static diaphragm flexure indicative of that pressure;
   C) a diaphragm exciter, including a coil so disposed as to receive from the permanent magnet an axial magnetic flux that depends on the permanent-magnet displacement, that subjects the diaphragm to flexural excitation and resultant permanent-magnet oscillation by driving the coil with current that generates a coil magnetic field that applies a force to the diaphragm assembly and thereby causes an oscillatory signal in the coil in response to the permanent-magnet oscillation;
   D) a saturable magnetic circuit so positioned with respect to the coil and the permanent magnet as to affect the coil inductance and saturate in response to the permanent-magnet field to a degree that varies with the permanent-magnet displacement;
   E) a computation circuit responsive both to the coil inductance and to the frequency of the oscillatory signal to compute fluid load as a function of a coil-inductance-dependent quantity and an oscillatory-signal-frequency-dependent quantity.

2. A fluid-load sensor as defined in claim 1 wherein the computation circuit:
   A) determines a pressure value from the coil-inductance-dependent quantity;
   B) determines a pressure-compensation factor from the pressure value;
   C) determines a compensated frequency value from the frequency of the oscillatory signal and the pressure-compensation factor; and
   D) computes the fluid load as a function of the compensated frequency value.

3. A fluid-load sensor as defined in claim 2 wherein the computation circuit determines a pressure value from the coil-inductance-dependent quantity by:

A) taking a quantity dependent on temperature;
B) determining a temperature-correction factor from the quantity dependent on temperature;
C) determining a temperature-adjusted value from the temperature-correction factor and the coil-inductance-dependent quantity; and
D) computing the pressure value as a function of the temperature-adjusted value.

4. A fluid-load sensor as defined in claim 3 wherein the computation circuit:
A) further takes the coil constant-stimulus response; and
B) determines the quantity dependent on temperature from the coil constant-stimulus response.

5. A fluid-load sensor as defined in claim 3 wherein the computation circuit measures the coil transient response to obtain the quantity dependent on the coil inductance.

6. A fluid-load sensor as defined in claim 5 wherein:
A) the computation circuit takes plurality of samples during each of a first and a second time segment, each of which occurs during the coil transient response, and determines first and second totals, respectively, of the samples taken during the first and second segments; and
B) the coil-inductance-dependent quantity is a function the first and second totals.

7. A fluid-load sensor as defined in claim 6 wherein:
A) the computation circuit applies a step stimulus to the coil;
B) the samples taken during the first and second time segments are samples of an initial portion of the coil response to the step stimulus;
C) the computation circuit takes a plurality of samples of the step response during a third time segment, which occurs after the coil transient response substantially dies out; and
D) the coil-inductance-dependent quantity is a ratio of:
   i) the difference between a quantity proportional to the total of the samples taken during the third time segment and a quantity proportional to the total of the samples taken during one of the first and second time segments to:
   ii) the difference between a quantity proportional to the total of the samples taken during the third time segment and a quantity proportional to the total of the samples taken during the other of the first and second time segments.

8. A fluid-load sensor as defined in claim 7 wherein the constant-stimulus response from which the computation circuit determines the quantity dependent on temperature is the portion of the step response that occurs during the third time segment.

9. A fluid-load sensor as defined in claim 3 wherein:
A) the computation circuit applies a step stimulus to the coil; and
B) the constant-stimulus response from which the computation circuit determines the quantity dependent on temperature is the portion of the step response that occurs after the coil transient response substantially dies out.

10. A fluid-load sensor as defined in claim 9 wherein:
A) the computation circuit takes a plurality of samples of the portion of the step response that occurs after the coil transient response substantially dies out; and
B) the quantity dependent on temperature is a quantity proportional to the total of the samples thus taken.

11. A fluid-load sensor as defined in claim 2 wherein the computation circuit measures the coil transient response to obtain the quantity dependent on the coil inductance.

12. A fluid-load sensor as defined in claim 11 wherein:
A) the computation circuit takes a plurality of samples during each of a first and a second time segment, each of which occurs during the coil transient response, and determines first and second totals, respectively, of the samples taken during the first and second segments; and
B) the coil-inductance-dependent quantity is a function the first and second totals.

13. A fluid-load sensor as defined in claim 12 wherein:
A) the computation circuit applies a step stimulus to the coil;
B) the samples taken during the first and second time segments are samples of an initial portion of the coil response to the step stimulus;
C) the computation circuit takes a plurality of samples of the step response during a third time segment, which occurs after the coil transient response substantially dies out; and
D) the coil-inductance-dependent quantity is a ratio of:
   i) the difference between a quantity proportional to the total of the samples taken during the third time segment and a quantity proportional to the total of the samples taken during one of the first and second time segments to:
   ii) the difference between a quantity proportional to the total of the samples taken during the third time segment and a quantity proportional to the total of the samples taken during the other of the first and second time segments.

14. A fluid-load sensor as defined in claim 1 wherein:
A) the computation circuit computes a discrete Fourier transform of the oscillatory signal; and
B) the oscillatory-frequency-dependent quantity is the frequency of the discrete-Fourier-transform peak.

15. A fluid-load sensor as defined in claim 1 wherein the saturable magnetic circuit includes a movable portion mounted on the diaphragm and also includes a stationary portion that forms with the movable portion a gap that varies with the pressure on the unknown fluid and is approximately as wide as the thickness of the permanent magnet in the direction of the permanent-magnet magnetic field.

16. A method for sensing a fluid load comprising:
A) providing a diaphragm assembly including:
   i) a flexible diaphragm forming first and second diaphragm faces; and
   ii) a permanent magnet that generates a permanent-magnet field and is mounted on the diaphragm for displacement with flexure thereof;
B) exposing the first diaphragm face to an unknown fluid under pressure and permitting static diaphragm flexure indicative of that pressure;
C) providing a coil so disposed as to receive from the permanent magnet an axial magnetic flux that depends on the permanent-magnet displacement;
D) providing a saturable magnetic circuit so positioned with respect to the coil and the permanent magnet as to affect the coil inductance and saturate in response to the permanent-magnet field to a degree that varies with the permanent-magnet displacement;
E) measuring a coil-inductance-dependent quantity with the diaphragm in a quiescent state;

F) driving the coil with current that generates a coil magnetic field that applies a force to the diaphragm assembly and thereby causes an oscillatory signal in the coil in response to the permanent-magnet oscillation; and G) computing fluid load as a function of the coil-inductance-dependent quantity and an oscillatory-frequency-dependent quantity.

17. A method as defined in claim 16 wherein the computing of fluid load includes:

A) determining a pressure value from the coil-inductance-dependent quantity;

B) determining a pressure-compensation factor from the pressure value;

C) determining a compensated frequency value from the oscillatory signal's frequency and the pressure-compensation factor; and D) computing the fluid load as a function of the compensated frequency value.

18. A method as defined in claim 17 wherein the pressure value is determined from the coil-inductance-dependent quantity by:

A) taking a quantity dependent on temperature;

B) determining a temperature-correction factor from the quantity dependent on temperature;

C) determining a temperature-adjusted value from the temperature-correction factor and the coil-inductance-dependent quantity; and D) computing the pressure value as a function of the temperature-adjusted value.

19. A method as defined in claim 18 wherein the taking of a quantity dependent on temperature includes:

A) taking the coil constant-stimulus response; and

B) determining therefrom the quantity dependent on temperature.

20. A method as defined in claim 18 wherein the quantity dependent on the coil inductance is determined by measuring the coil transient response.

21. A method as defined in claim 20 wherein:

A) the method includes taking a plurality of samples during each of a first and a second time segment, each of which occurs during the coil transient response, and determines first and second totals, respectively, of the samples taken during the first and second segments; and B) the coil-inductance-dependent quantity is a function the first and second totals.

22. A method as defined in claim 21 wherein:

A) the method includes applying a step stimulus to the coil;

B) the samples taken during the first and second time segments are samples of an initial portion of the coil response to the step stimulus;

C) the method includes taking a plurality of samples of the step response during a third time segment, which occurs after the coil transient response substantially dies out; and D) the coil-inductance-dependent quantity is a ratio of:

i) the difference between a quantity proportional to the total of the samples taken during the third time segment and a quantity proportional to the total of the samples taken during one of the first and second time segments to:

ii) difference between a quantity proportional to the total of the samples taken during the third time segment and a quantity proportional to the total of the samples taken during the other of the first and second time segments.

23. A fluid-load sensor as defined in claim 22 wherein the constant-stimulus response from which the quantity dependent on temperature determined is the portion of the step response that occurs during the third time segment.

24. A method as defined in claim 18 wherein:

A) the method includes applying a step stimulus to the coil; and

B) the constant-stimulus response from which the quantity dependent on temperature is determined is the portion of the step response that occurs after the coil transient substantially dies out.

25. A fluid-load sensor as defined in claim 24 wherein:

A) the method includes taking a plurality of samples of the portion of the step response that occurs after the coil transient substantially dies out; and B) the quantity dependent on temperature is a quantity proportional to the total of the samples thus taken.

26. A method as defined in claim 17 wherein the quantity dependent on the coil inductance is determined by measuring the coil transient response.

27. A method as defined in claim 26 wherein:

A) the method includes taking plurality of samples during each of a first and a second time segment, each of which occurs during the coil transient response, and determines first and second totals, respectively, of the samples taken during the first and second segments; and B) the coil-inductance-dependent quantity is a function the first and second totals.

28. A method as defined in claim 27 wherein:

A) the method includes applying a step stimulus to the coil;

B) the samples taken during the first and second time segments are samples of an initial portion of the coil response to the step stimulus;

C) the method includes taking a plurality of samples of the step response during a third time segment, which occurs after the coil transient substantially dies out; and D) the coil-inductance-dependent quantity is a ratio of:

i) the difference between a quantity proportional to the total of the samples taken during the third time segment and a quantity proportional to the total of the samples taken during one of the first and second time segments to:

ii) the difference between a quantity proportional to the total of the samples taken during the third time segment and a quantity proportional to the total of the samples taken during the other of the first and second time segments.

29. A fluid-load sensor as defined in claim 16 wherein:

A) the method includes computing a discrete Fourier transform of the oscillatory signal; and B) the oscillatory-frequency-dependent quantity is the frequency of the discrete-Fourier-transform peak.

* * * * *